Patented Oct. 28, 1930

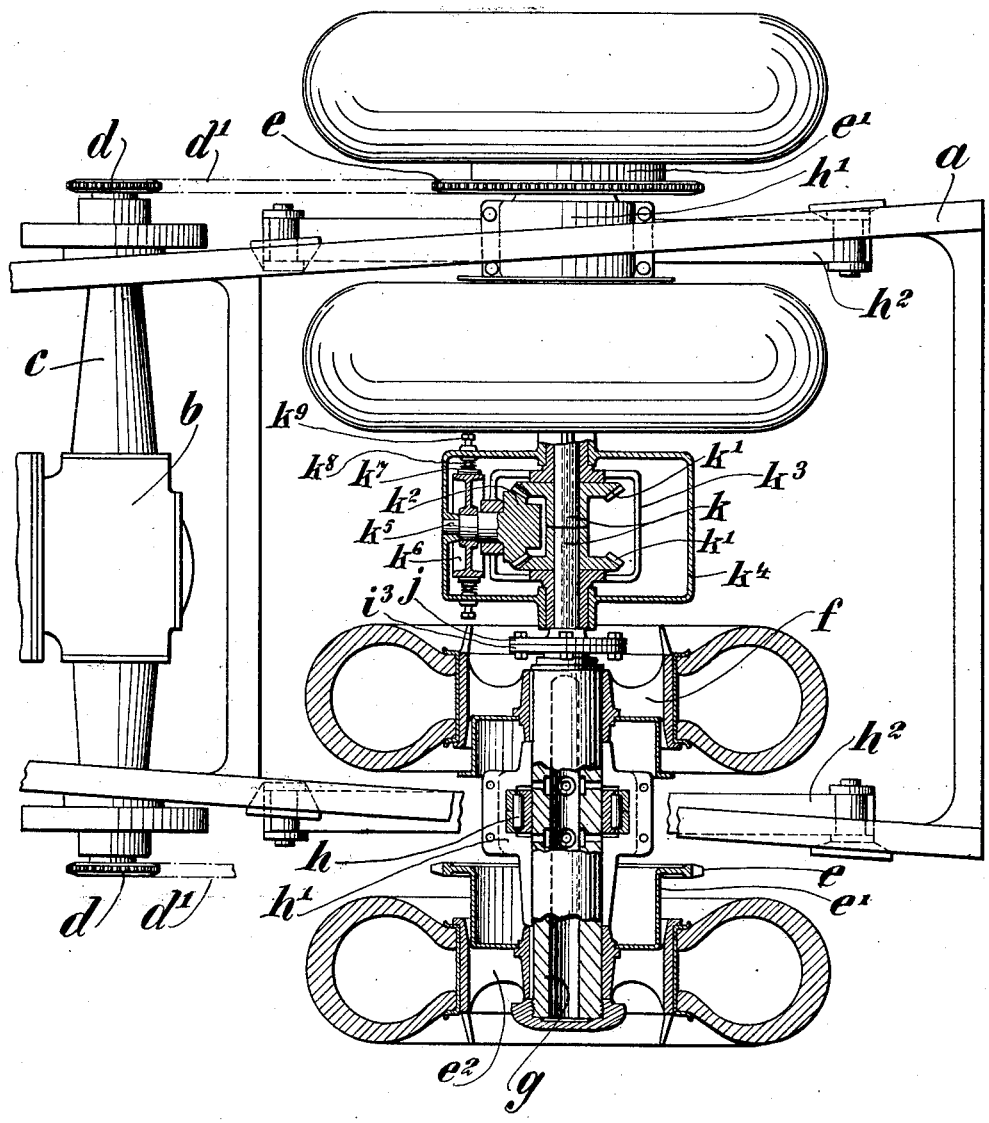

1,779,629

UNITED STATES PATENT OFFICE

LYMAN C. JOSEPHS, JR., OF ALLENTOWN, PENNSYLVANIA, ASSIGNOR TO INTERNATIONAL MOTOR COMPANY, OF NEW YORK, N. Y., A CORPORATION OF DELAWARE

FRICTION DIFFERENTIAL

Application filed March 19, 1930. Serial No. 437,038.

The present invention relates to final drives for motor vehicles and embodies, more specifically, an improved drive, wherein means is provided for preventing the slipping of one driving wheel with respect to another when the condition of the road surface is of such character that traction is reduced a predetermined extent.

The disadvantageous conditions frequently existing where power is apportioned between two driving wheels by means of a differential causes stalling of the vehicle when one wheel or pair of wheels is upon a slippery road surface, regardless of the traction available through other wheels to which power is apportioned. Attempts have been made to overcome this condition by locking the differential mechanism and preventing the apportionment of power between the wheels, thus destroying the differential action of the mechanism. In devices of this character, it has been necessary to manipulate the mechanism from a very inconvenient location and usually the operation of the locking mechanism has been effected from beneath the frame and directly on the differential housing. The extreme inconvenience of this structure is readily apparent and need not be discussed further herein.

In accordance with the present invention, it is proposed to provide a friction drum by means of which a desired resistance may be exerted against the differentiation of power between a plurality of driving elements under certain conditions, particularly where one of the driving elements is rotating faster than another.

An object of the present invention, accordingly, is to provide a device for resisting the relative rotation of one driven element with respect to another.

A further object of the invention is to provide a device for resisting the slippage of one wheel of a plurality of driven wheels.

A further object of the invention is to provide a device for automatically resisting the relative rotation of one driven element with respect to another, power being supplied to such driven elements through a differential mechanism of the usual form.

Further objects of the invention will be apparent as it is described in greater detail in connection with the accompanying drawing, wherein the single figure is a plan view, partly broken away and in section, showing a device constructed in accordance with the present invention.

In the above drawing, the side frame members of a motor vehicle are shown at $a$, carrying thereon a differential $b$ and jack shaft housing $c$. Driving sprockets $d$ are provided upon either side of the frame and supply power through chains $d'$ (indicated in dot and dash lines) to driven sprockets $e$ which are mounted upon brake drums $e'$ carried with wheels $e^2$. Wheels $e^2$ are the outer of pairs of wheels, the inner wheels of which are shown at $f$ and both wheels of the respective pairs are mounted upon shaft section $g$ which are journaled in bearings $h$, carried by journal boxes $h'$.

The foregoing journal boxes are secured to springs $h^2$ which are mounted upon the respective side frame members in the usual manner and, in this manner, the desirable features of using dual tires are provided without increasing the overall width of the vehicle beyond a predetermined desired maximum. Each shaft section is formed with a flange $i^3$ to which flanges $j$ of an intermediate shaft section are secured.

This intermediate shaft section comprises a pair of abutting shafts $k$, upon which the flanges $j$ are mounted. These shafts have secured thereto bevel gears $k'$ between which bevel pinion $k^2$ engages. This pinion is carried by a carrier $k^3$ which is rotatably mounted upon the stub shafts $k$ and housing $k^4$ is in turn journaled upon the stub shafts $k$ over the journals for the carrier $k^3$.

The pinion $k^2$ is provided with a shaft $k^5$ which is journaled in the housing $k^4$ and carries a brake drum $k^6$. Upon the periphery of this brake drum, shoes $k^7$ are adapted to engage, springs $k^8$ serving to urge the shoes against the brake drum. The tension of these springs may be varied by means of set screws $k^9$ and thus a constant friction is exerted upon the drum $k^6$.

It will be seen, from the foregoing construction, that the housing $k^4$ and associated structure will freely rotate within the shaft sections $g$ in accordance with the rotation of the wheels $f$ when the vehicle is moving forwardly or rearwardly. If the traction of one wheel or a pair of wheels is reduced to such an extent that such wheel or wheels slip, one of the bevels $k'$ will rotate with respect to the other and cause pinion shaft $k^5$ and brake drum $k^6$ to rotate within the housing $k^4$. Such rotation is resisted by the brake shoes $k^7$ and thus the free apportionment of power between the respective wheels is destroyed and a portion of the power supplied to the wheel which is not slipping. In this manner, the vehicle may pull itself out of what might otherwise be a stalled position without requiring the manual manipulation of any elements or the locking of the differential mechanism on the vehicle. When the vehicle turns on ground furnishing good adhesion, the resistance of the brake shoes to such turning is not sufficient to prevent the turn and the shoes will therefore slip on the brake drum.

While the invention has been described with specific reference to the accompanying drawings, it is not to be limited, save as defined in the appended claims.

I claim as my invention:

1. A device of the character described comprising a plurality of driving wheels between which power is apportioned, shaft sections mounted to rotate with the wheels, a carrier carried by the sections, a housing for the carrier, gears on the sections in the carrier, a shaft journaled in the housing and carrier, a gear on the last named shaft engaging the first gear, a brake drum on the last named shaft section, brake shoes engaging the drum, and means to adjust the tension on the brake shoes.

2. A device of the character described comprising a plurality of driving wheels between which power is apportioned, shaft sections mounted to rotate with the wheels, a carrier carried by the sections, a housing for the carrier, gears on the sections in the carrier, a shaft journaled in the housing and carrier, a gear on the last named shaft engaging the first gear, a brake drum on the last named shaft section, and brake shoes engaging the drum.

3. A device of the character described comprising a plurality of driving wheels between which power is apportioned, shaft sections mounted to rotate with the wheels, a carrier carried by the sections, a housing for the carrier, gears on the sections in the carrier, a shaft journaled in the housing and carrier, a gear on the last named shaft engaging the first gear, and means to resist rotation of the last named gear.

4. A device of the character described comprising a plurality of driving wheels between which power is apportioned, shaft sections mounted to rotate with the wheels, a carrier carried by the sections, gears on the sections in the carrier, a gear engaging the first gears and mounted on the carrier, and means to resist rotation of the gear.

5. A device of the character described comprising a plurality of driving wheels between which power is apportioned, shaft sections mounted to rotate with the wheels, gears on the sections, a gear connected between the last named gears, and braking means associated with the last gear.

6. A device of the character described comprising a plurality of driving wheels between which power is apportioned, shaft sections mounted to rotate with the wheels, gears on the sections, a gear connected between the last named gears, and means to resist rotation of the last gear.

This specification signed this 3rd day of March, A. D. 1930.

LYMAN C. JOSEPHS, Jr.